United States Patent [19]
Umemoto et al.

[11] Patent Number: 4,800,943
[45] Date of Patent: Jan. 31, 1989

[54] TIRE BEAD DISLODGING DEVICE

[75] Inventors: Hitoo Umemoto; Tomio Wakatsuki, both of Osaka, Japan

[73] Assignee: The Ohtsu Tire & Rubber Co., Ltd., Izumi-Ohtsu, Japan

[21] Appl. No.: 89,264

[22] Filed: Aug. 25, 1987

[30] Foreign Application Priority Data

Dec. 27, 1986 [JP] Japan ................................ 61-315714

[51] Int. Cl.⁴ ............................................. B60C 25/07
[52] U.S. Cl. ................................................. 157/1.17
[58] Field of Search .................... 157/1.17, 1.3, 1.1, 157/1.26, 1.28

[56] References Cited

U.S. PATENT DOCUMENTS 2,367,638  1/1945  McCulloch ...................... 157/1.17

FOREIGN PATENT DOCUMENTS 55-68408  5/1980  Japan .
59-170003  11/1984  Japan .
2034258  6/1980  United Kingdom .

Primary Examiner—Debra Meislin
Attorney, Agent, or Firm—Sixbey, Friedman, Leedom & Ferguson

[57] ABSTRACT

A device for dislodging a tire bead from the bead seat of a wheel rim comprises a support member positionable on the upper side of the wheel rim, a pair of engaging pawl portions provided on the support member and engageable with the wheel rim from outside the outer periphery thereof at diametrically opposed positions of the rim for removably fixing the support member to the wheel rim, and a bead pusher provided on the support member adjacent to at least one of the engaging pawl portions. With the wheel rim clamped between the pawl portions at the opposed positions, the bead pusher is driven by rotating a screw to cause the pusher to dislodge the bead from the bead seat and push the bead into the center drop of the wheel rim.

6 Claims, 2 Drawing Sheets

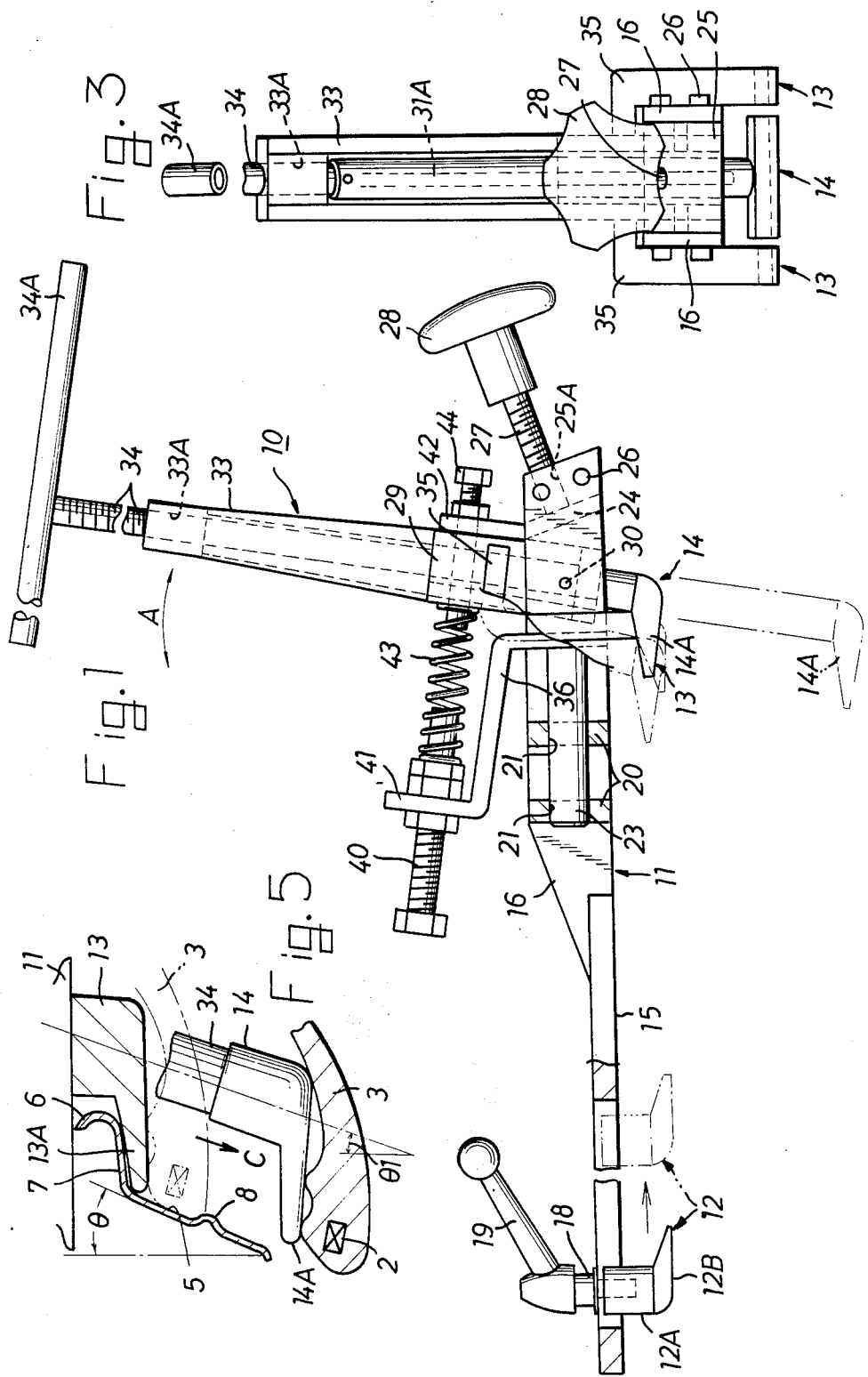

U.S. Patent  Jan. 31, 1989  Sheet 2 of 2  4,800,943
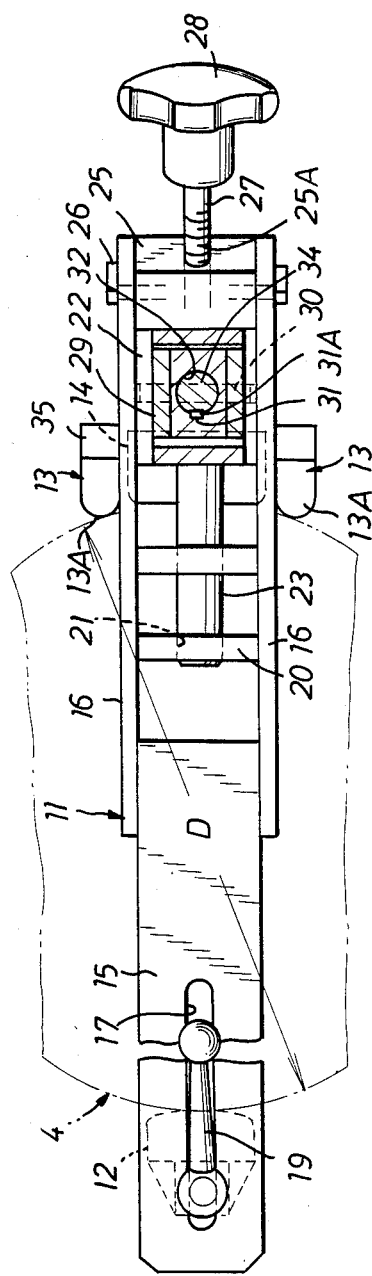
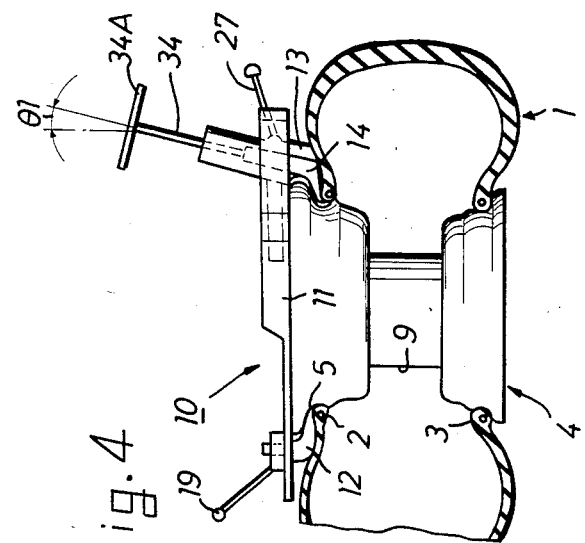

TIRE BEAD DISLODGING DEVICE

FIELD OF THE INVENTION AND RELATED ART STATEMENT

The present invention relates to a tire bead dislodging device, and more particularly to a device for use in dislodging the bead of a tire from its wheel rim bead seat by pushing the bead into the center drop of the rim.

Unexamined Japanese Patent Publication SHO No. 55-68408 (GB No. 2 034 258 A) discloses a tire bead dislodging tool or device (conventional device 1), and Unexamined Japanese Utility Model Publication SHO No. 59-170003 discloses another bead dislodging device (conventional device 2).

The conventional device 1 comprises a large main frame having a support frame for placing thereon a tire in an inclined position, and a bead dislodgement tool for dislodging the tire bead from its wheel rim bead seat downward by pushing an operating arm downward. The device is therefore large-sized and inconvenient to carry around, while the dislodgement tool does not fit to the rim and encounters difficulty in dislodging the tire bead.

The conventional device 2 comprises a support member positionable on the upper side of a wheel rim, and means for fixing the support member to the rim removably. The support member is provided with an engaging portion for engaging the inner periphery of the wheel rim, and a bead dislodging tool which is slidable upward and downward and also longitudinally of the support member. The dislodging tool is provided with a drive screw mechanism for slidingly moving the tool toward the engaging portion by manipulating a handle, and a depressing screw mechanism for slidingly moving the tool downward. Although the problems of the conventional device 1 are solved by this device, the support member must be separated from its frame every time the device is set on a tire and also after the dislodgement of the bead. Further since the bead seat of the rim has an angle with respect to the axis of the rim, the two screw mechanisms must be operated alternately to move the tool along the inclined bead seat when dislodging the bead downward. The device is therefore cumbersome to use. The dislodging tool, which is forced radially inwardly of the rim while being pushed down, is likely to cause damage to the wheel rim.

OBJECTS AND SUMMARY OF THE INVENTION

The present invention has been accomplished in order to overcome the foregoing problems heretofore encountered.

More specifically, a first object of the present invention is to provide a tire bead dislodging device which is readily portable and easy to set on a tire and by which the bead of the tire can be easily and reliably dislodged from its wheel rim bead seat without causing damage to the wheel rim by pressing a bead pusher against the bead downward along the inclination of the bead seat after setting the device.

A second object of the invention is to provide a device comprising a pair of engaging pawl portions engageable with the outer periphery of the wheel rim at diametrically opposed positions of the rim, one of the pawl portions being slidable but fixedly positionable to render the device adjustable to wheel rims of varying diameters so that the beads of tires of different sizes can be readily and reliably dislodged from their wheel rim bead seats.

A third object of the invention is to provide a device of the type described wherein one of the engaging pawl portions serves to roughly adjust the device to the diameter of the wheel rim, and the other pawl portion is movable by rotating a screw for finely adjusting the device to the rim diameter, so that the device can be set on the wheel rim quickly and accurately.

A fourth object of the invention is to provide a device of the type described wherein the bead pusher can be pressed against the tire bead axially of the tire by rotating a screw and is adjustable in accordance with the angle of the bead seat of the wheel rim even when the angle varies from tire to tire, the device thus being made usable for various tires.

Other objects of the present invention will become more apparent from the following description with reference to the accompanying drawings.

The present invention provides a tire bead dislodging device mountable on the upper side of a wheel rim and having means for pushing a tire bead into the center drop of the wheel rim. To fulfill the above objects, the device comprises a support member positionable on the upper side of the wheel rim, a pair of engaging pawl portions provided on the support member and engageable with the wheel rim from outside the outer periphery thereof at diametrically opposed positions of the rim for removably fixing the support member to the wheel rim, and a bead pusher provided on the support member adjacent to at least one of the engaging pawl portions for pushing the tire bead axially of the tire in a direction approximately at the same angle as the bead seat of the wheel rim with respect to the axis of the tire.

According to the present invention, the support member is fixed to the upper side of a wheel rim by clamping the wheel rim with the pair of pawl portions in engagement with the outer periphery of the rim at diametrically opposed positions thereof. In this case, one of the engaging pawl portions serves for rough adjustment, and the other pawl portion for fine adjustment.

When the device is thus set in position, the bead pusher is forced down, whereby the bead is pushed out of contact with the wheel rim bead seat into the center drop of the wheel rim. At this time, the pusher is forced downward axially of the tire along the inclination of the bead seat. Accordingly, the pusher need not be forced radially inwardly of the wheel rim while being thus moved down.

BRIEF DESCRIPTION OF THE DRAWINGS

FIG. 1 is a side elevation partly broken away and showing an embodiment of the invention in its entirety;

FIG. 2 is a plan view showing the same partly in section;

FIG. 3 is a rear view of the same;

FIG. 4 is a side elevation showing the embodiment as set on a tire; and

FIG. 5 is a fragmentary view in section illustrating how a bead is dislodged.

DESCRIPTION OF THE PREFERRED EMBODIMENT

An embodiment of the invention will be described in detail with reference to the drawings.

Referring to FIG. 4, a tire 1 has beads 3 each having a bead core 2 and fitted to the bead seats 5 of a wheel rim 4.

As shown also in FIG. 5, the wheel rim 4 has flanges 7 each provided with a curl portion 6. The bead seat 5 extends outward axially of the tire at an angle of $\theta$ with respect to the axis of the tire and has a rim hump 8. The rim 4 further has a center drop 9.

The illustrated tire bead dislodging device 10 comprises a support member 11 positionable on the upper side of the wheel rim 4, a pair of engaging pawl portions 12, 13 provided on the support member 11 and engageable with the wheel rim 4 from outside the outer periphery thereof at diametrically opposed positions of the rim, and a bead pusher 14 disposed adjacent to one of the engaging pawl portions, 13, for depressing the tire bead 3.

With reference to FIGS. 1 to 3, the support member 11 has a length larger than the outside diameter D and comprises a horizontal flat plate 15 and a pair of upright side plates 16 attached to opposite long sides of the flat plate 15 as by welding. The flat plate 15 is formed with a slot 17 extending longitudinally of the plate 15. The pawl portion 12 has a stem 12A fitting in the slot 17 and slidable only longitudinally of the slot. The stem 12A is prevented from slipping off by a washer plate 18 which can be fastened to the flat plate 15 by a screw rod using a handle 19.

Accordingly, the pawl portion 12 is movable radially of the tire within the range of the slot 17 but can be fixed in a desired position. Thus, the pawl portion 12 serves to roughly adjust the device 10 to varying wheel rim diameters.

The engaging pawl portion 12 has a pawl 12B positioned below the plate 15 having a thickness decreasing radially inward of the tire. The pawl 12B is therefore so shaped as to readily engage with the rim flange 7 from outside and disengage therefrom.

The side plates 16 are fixedly provided with two rib plates 20 positioned therebetween and each formed with a guide hole 21. A slide block 22, box-shaped in cross section, is fitted in the space between the side plates 16 and is slidable longitudinally thereof. The guide block 22 has a guide rod 23 projecting therefrom and extending through the guide holes 21. Thus, the slide block 22 is linearly slidable longitudinally of the support member 11, i.e. inward or outward radially of the tire 1.

Disposed behind a rear wall 24 of the slide block 22 is a drive screw support 25 internally threaded as at 25A and fixed to the side plates 16 by fastening members 26. A drive screw rod 27 screwed into the threaded bore 25A is inclined rearwardly upward and bears on the rear wall 24 perpendicular thereto. The drive screw rod 27 has a grip 28, which, when rotated, finely moves the slide block 22 radially inward of the tire.

The slide block 22 carries the engaging pawl portion 13, which is therefore movable by rotating the drive screw rod 27 for fine adjustment.

The slide block 22, which is provided with the pawl portion 13 has fitted therein a support frame 29 for the bead pusher 14. The support frame 29 is pivoted to the slide block 22 by a pin 30. The frame 29 is tiltable about the pin 30 in the direction of arrow A in FIG. 1.

A support bore 32 having a key groove 31 vertically extends through the support frame 29. The frame 29 projects upward beyond the side plates 16. A post 33 internally threaded as at 33A at its upper end portion is mounted upright on the upper end of the frame 29.

A screw rod 34 having a pusher handle 34A and screwed in the threaded bore 33A has an unthreaded lower rod portion which extends through the support bore 32 of the support frame 29, with a key 31A on the rod portion fitted in the key groove 31. The bead pusher 14 is attached to the lower end rod portion of the screw rod 34.

When rotated, the screw rod 34 is movable upward or downward relative to the support frame 29 in a direction at an angle $\theta_1$ with respect to the axis of the tire. This angle $\theta_1$ is equal to or approximately equal to the angle $\theta$ of the bead seat 5. Thus, when the handle 34A is rotated forward or reversely, the bead pusher 14 pushes the tire bead 3 downward substantially axially of the tire axis along the bead seat 5, or is moved away from the pushed-down tire bead 3.

The bead pusher 14 has a flat pawl 14A positioned below the side plates 16 and having a thickness decreasing radially inwardly of the tire. The engaging pawl portion 13 is disposed at opposite sides of the pawl 14A.

The engaging pawl portion 13 includes pawls 13A attached to the respective lower ends of arms 35 projecting from opposite sides of the support frame 29 and further extending downward. These pawls 13A are positioned slightly closer to the tire than the pawl 14A of the bead pusher 14 and are tapered toward the tire.

Accordingly, both the engaging pawl portion 13 and the bead pusher 14 are finely movable radially inward of the tire by rotating the drive screw rod 27, whereby the pawls 13A and 14A can be forced in between the rim flange 7 and the bead 3 in engagement therewith as shown in FIG. 5.

The support frame 29 may be fixedly mounted on the slide block 22 instead of being pivoted to the block 22 with the pin 30 insofar as the screw rod 34 can be positioned at the angle $\theta_1$, equal to or approximately equal to the angle $\theta$, with respect to the axis of the tire. However, since the angle $\theta$ differs from wheel rim to wheel rim, the frame 29 is made adjustable and fixedly positionable in accordance with the angle.

Stated more specifically, the front wall 36 of the slide block 22 is bent and thereby opposed to the front side of the support frame 29 to provide a mount portion 41 for an adjusting member 40. On the other hand, an upstanding portion 42 extends upward from the rear wall 24 of the slide block 22 for supporting the rear side of the support frame 29. The upstanding portion 42 has a screw 44 extending through the support frame 29 for retaining a coiled spring 43 thereon. The adjusting member 40, which is in the form of a screw, is movable forward or rearward in screw-thread engagement with the mount portion 41 but can be fixed to the portion 41. The coiled spring 43 is provided between and retained on the adjusting member 40 and the screw 44.

Consequently, the support frame 29, which is tiltable in the direction of arrow A as supported by the pin 30, can be held by the screw 44, adjusting member 41, spring 43, etc. at the angle $\theta_1$ which is substantially equal to the angle $\theta$.

A brief description will be given of the procedure for dislodging the tire bead 3 from the bead seat 5 by the device 10 of the present embodiment.

First, the support member 11 is placed on the upper side of the wheel rim 4, and the engaging pawl portion 12 as positioned according to the wheel rim diameter D is engaged with the outer periphery of the rim flange 7.

The edge defining the slot 17 may be marked with a scale indicating wheel rim diameters to facilitate the engagement.

On the other hand, the engaging pawl portion 13 and the bead pusher 14 opposed to the pawl portion 12 diametrically of the tire are moved radially inward of the tire by rotating the screw rod 27 and thereby sliding the slide block 22, whereby the pawls 13A, 14A are forced in between the rim flange 7 and the bead 3 from outside the outer periphery of the rim 4 as shown in FIG. 5. Thus, the support member 11 is set in position on the assembly of wheel rim 4 and tire 1 by the pawl portions 12 and 13.

The handle 34A is then rotated to force the screw rod 34 downward, causing the bead pusher 14 to gradually push the bead 3 downward as indicated by an arrow C in FIG. 5 into the center drop 9.

At this time, the pawl portion 13 coacts with the pawl portion 12 to clamp the rim 4 diametrically thereof from outside, allowing the pusher 14 only to be forced downward along the bead seat 5 which is inclined at the angle $\theta$ with the tire axis. This eliminates the need to force the pusher 14 radially inwardly of the rim during the dislodging operation.

After the bead 3 has been dislodged from the bead seat 5, the pawl portions 12 and 13 are released from clamping engagement with the rim.

The bead 3 on the opposite side of the wheel rim is dislodged in the same manner as above, with the tire 1 turned upside down.

The support member 11 as placed on the upper side of the wheel rim 4 is removably fixed to the rim 4 by the engaging pawl portions 12, 13 which are releasably engaged with the outer periphery of the wheel rim 4 at diametrically opposed positions of the rim 4. The device 10 can therefore be set in position very easily and reliably. The device 10, which can be set in position by the pawl portions 12, 13 on the support member 11, is compact in its entirety and is convenient to carry around.

The bead pusher 14 for pushing down the tire bead 3 along the bead seat 5 of the wheel rim 4 substantially along the axis of tire is provided on the support member 11 adjacent to at least one of the pawl portions, 13, so that even when the tire bead 3 is dislodged and progressively pushed down by the pusher 14, there is no need to force the pusher 14 radially inward of the tire. This renders the device 10 easy to use and eliminates the likelihood that the bead pusher 14 will cause damage to the wheel rim 4.

While the present invention has been described above with reference to the illustrated embodiment, the invention can be modified variously. For example, the lower portion of the screw rod 34 may be splined to the support frame 29 in place of the key 31A and groove 31. The support frame 29, which is tiltable, may be fixedly mounted on the slide block 22. The bead pusher 14 may be provided adjacent to each of the engaging pawl portions 12 and 13.

What is claimed is:

1. A tire bead dislodging device, comprising a support member which is positionable only on a topside of a tire rim and is provided with a pair of opposing pawls movably attached thereto, one of which is comprised of a pair of pawl members, and means for removably engaging said pawls on the tire rim by displacing said pawls longitudinally along said support member and radially with respect to a periphery of the rim, and also comprising a bead pusher which is mounted on the support member for pushing down upon a bead of a tire mounted on said rim;
   wherein said support member is provided with a slide block which is slidable longitudinally of the support member and radially of the tire rim for fixing the tire rim thereunder;
   wherein an upstanding screw rod is provided with said bead pusher at a lower end thereof, said upstanding screw rod being threaded vertically through said slide block, and said bead pusher at said lower end of the upstanding screw rod extending between the pawl members;
   wherein the bead pusher is displaceable by action of said upstanding screw rod for pushing down upon a tire bead in an axial direction relative to a tire axis while the support member is held by engagement of the pawls with an outer surface of the rim; and
   wherein the upstanding screw rod, provided with the bead pusher, extends at a predetermined upward and outward angle relative to the tire axis, which is substantially equal to an angle formed by a bead seat portion of the tire rim relative to the tire axis, as a means for causing the bead pusher to be displaced by said screw rod substantially parallel to said bead seat portion by turning of said upstanding screw rod.

2. A tire bead dislodging device as claimed in claim 1, wherein the support member extends across the full diameter of the tire rim and is comprised of a flat plate and of a pair of upright side plates which are attached to two opposite sides of the flat plate;
   wherein the side plates are fixedly provided with two rib plates positioned therebetween, each rib plate being formed with a guide hole;
   wherein the slide block is fitted in a space between the side plates and has a guide rod which extends through the guide hole of each rib plate and is slidable longitudinally of the support member; and
   wherein a drive screw support is fixed between the side plates, and a drive screw rod is screwed into a threaded bore formed in the drive screw support to enable the drive screw rod to serve as a means for sliding the slide block.

3. A tire bead dislodging device as claimed in claim 1, wherein a support frame is pivotally attached to the slide block and is provided with an upwardly projecting hollow post, at an upper end portion of which an internal thread is formed, said upstanding screw rod being threaded through said hollow post, and being provided with a handle at the top end thereof.

4. A tire bead dislodging device as claimed in claim 2, wherein the flat plate of the support member has a slot formed in it extending longitudinally of the plate and radially relative to the tire rim; and
   wherein a stem of one of the pawls of said pair of pawls is fitted in the slot in a manner permitting only sliding movement; and
   wherein a tightening screw rod having a washer and a handle are provided for fixing said stem in place within said slot.

5. A tire bead dislodging device as claimed in claim 4, wherein the slide block is provided with a rear wall against which an end of the drive screw rod abuts and from which said drive screw rod extends upwardly at an angle; and
   wherein a grip is provided at a top end of the drive screw rod.

6. A tire bead dislodging device as claimed in claim 5, wherein an upstanding portion is formed on the rear wall of the slide block; wherein a support frame for the bead pusher is pivotally mounted to the slide block by a pin;

wherein a screw is provided that extends through the support frame and is mounted to penetrate through the upstanding portion;

wherein a front wall of the slide block is aligned opposite the upstanding portion so as to provide a mount for a threaded adjusting member; and wherein a coil spring is fitted between the adjusting member and the screw, as a means for enabling readjustment of said upward angle of the upstanding screw rod by a pivotal movement with the support frame about a fulcrum formed by said pin.

* * * * *